US012389323B2

(12) United States Patent
Xu et al.

(10) Patent No.: US 12,389,323 B2
(45) Date of Patent: Aug. 12, 2025

(54) WAKE-UP SIGNALING DURING A DISCONTINUOUS RECEPTION CYCLE

(71) Applicant: Apple Inc., Cupertino, CA (US)

(72) Inventors: Fangli Xu, Beijing (CN); Chunhai Yao, Beijing (CN); Dawei Zhang, Saratoga, CA (US); Haijing Hu, Los Gatos, CA (US); Haitong Sun, Cupertino, CA (US); Wei Zeng, Saratoga, CA (US); Yuchul Kim, San Jose, CA (US); Yuqin Chen, Beijing (CN); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 17/755,354

(22) PCT Filed: Nov. 7, 2019

(86) PCT No.: PCT/CN2019/116277
§ 371 (c)(1),
(2) Date: Apr. 27, 2022

(87) PCT Pub. No.: WO2021/087868
PCT Pub. Date: May 14, 2021

(65) Prior Publication Data
US 2022/0400433 A1 Dec. 15, 2022

(51) Int. Cl.
*H04W 72/23* (2023.01)
*H04W 52/02* (2009.01)
*H04W 76/28* (2018.01)

(52) U.S. Cl.
CPC ... *H04W 52/0216* (2013.01); *H04W 52/0229* (2013.01); *H04W 52/0235* (2013.01); *H04W 72/23* (2023.01); *H04W 76/28* (2018.02)

(58) Field of Classification Search
CPC ......... H04W 52/0216; H04W 52/0229; H04W 52/0235; H04W 72/23; H04W 76/28
(Continued)

(56) References Cited

U.S. PATENT DOCUMENTS

2015/0003311 A1* 1/2015 Feuersaenger .... H04W 52/0225
370/311
2017/0367111 A1* 12/2017 Gelabert .......... H04W 74/0833
(Continued)

FOREIGN PATENT DOCUMENTS

| CN | 109548054 | 3/2019 |
| CN | 110268755 | 9/2019 |
| WO | 2018/202693 | 11/2018 |

OTHER PUBLICATIONS

Vivo, "WUS Co-operation with C-DRX", 3GPP TSG-RAN WG2 Meeting #106, R2-1905955, May 17, 2019, 6 sheets.
(Continued)

Primary Examiner — Jean A Gelin
(74) Attorney, Agent, or Firm — Fay Kaplun & Marcin, LLP

(57) ABSTRACT

A method performed by a user equipment (UE) is described. The method includes establishing a connection to a network that includes discontinuous reception (DRX) cycles, each DRX cycle including a scheduled OnDuration and a wake up signal (WUS) opportunity corresponding to each of the scheduled OnDurations, when a WUS is received in the WUS opportunity for one of the scheduled OnDurations, configuring the UE to utilize an active mode of processing during the one of the scheduled OnDurations and when a WUS is not received in the WUS opportunity for one of the scheduled OnDurations, configuring the UE to utilize a sleep mode of inactivity during the one of the scheduled OnDurations.

20 Claims, 10 Drawing Sheets

(58) Field of Classification Search
USPC .......................................................... 370/311
See application file for complete search history.

(56) References Cited

U.S. PATENT DOCUMENTS

| | | | |
|---|---|---|---|
| 2019/0159280 A1* | 5/2019 | Chakraborty | H04W 76/15 |
| 2019/0239189 A1 | 8/2019 | Hwang et al. | |
| 2019/0261281 A1* | 8/2019 | Jung | H04W 72/0473 |
| 2019/0349066 A1* | 11/2019 | Yang | H04B 7/0697 |
| 2020/0221384 A1* | 7/2020 | Ang | H04L 5/0092 |
| 2021/0051698 A1* | 2/2021 | Tsai | H04W 72/23 |
| 2021/0084586 A1* | 3/2021 | Loehr | H04W 76/28 |
| 2021/0105722 A1* | 4/2021 | Tsai | H04W 52/0229 |
| 2021/0239011 A1* | 8/2021 | Morisawa | F01D 11/001 |
| 2021/0368444 A1* | 11/2021 | Wang | H04W 52/0232 |
| 2021/0369445 A1* | 12/2021 | Chiu | A61F 2/1618 |
| 2021/0377852 A1* | 12/2021 | Zhou | H04W 52/0235 |
| 2022/0039009 A1* | 2/2022 | Iyer | H04W 52/0229 |
| 2022/0116869 A1* | 4/2022 | Guo | H04B 7/0695 |
| 2022/0209911 A1* | 6/2022 | Zou | H04W 56/001 |
| 2022/0210867 A1* | 6/2022 | Bergström | H04W 52/0216 |
| 2022/0286965 A1* | 9/2022 | Li | H04W 52/0232 |
| 2022/0369139 A1* | 11/2022 | Wang | H04W 36/305 |
| 2023/0413174 A1* | 12/2023 | Cheng | H04W 52/0216 |

OTHER PUBLICATIONS

Ericsson, "RAN2 impact of WUS in connected mode", 3GPP TSG-RAN2 Meeting #107bis, R2-1913197, Oct. 4, 2019, 7 sheets.

Huawei et al., "PDCCH-based power saving signal/channel", 3GPP TSG RAN WG1 Meeting #98bis, R1-1910076, Oct. 5, 2019, 21 sheets.

* cited by examiner

WAKE-UP SIGNALING DURING A DISCONTINUOUS RECEPTION CYCLE

BACKGROUND

A user equipment (UE) may establish a connection to at least one of a plurality of different networks or types of networks. In some networks, signaling between the UE and a base station of a network may occur over the millimeter wave (mmWave) spectrum. Signaling over the mmWave spectrum may be achieved by beamforming which is an antenna technique used to transmit or receive a directional signal.

The UE may also be configured to utilize a discontinuous reception (DRX) cycle. The DRX cycle is a specification or schedule that includes a set of active processing time periods and a set of available sleep time periods. A scheduled active processing time period may be referred to as an OnDuration. During an OnDuration, the UE is configured to perform operations that enable the UE to receive data that may be transmitted to the UE. During a DRX cycle, when an OnDuration is not scheduled, the UE has an opportunity to enter a sleep mode and conserve power.

In some network configurations, a wake-up signal (WUS) may be implemented during the DRX cycle to allow the UE to save further power. For example, there may be some OnDurations where the UE does not have to perform any operations and thus, the UE may stay asleep during these OnDurations. The WUS may be sent by the network at a predetermined time before the next OnDuration. The UE may monitor for the WUS and if the WUS is received, the UE may wakeup for the next OnDuration and if the WUS is not received, the UE may stay asleep. However, in some instances, the network may send the WUS, but the UE may not receive the WUS and stay asleep when the UE should have woken up for the next OnDuration.

SUMMARY

Exemplary embodiments include a method performed by a user equipment (UE). The method includes establishing a connection to a network that includes discontinuous reception (DRX) cycles, each DRX cycle including a scheduled OnDuration and a wake up signal (WUS) opportunity corresponding to each of the scheduled OnDurations, when a WUS is received in the WUS opportunity for one of the scheduled OnDurations, configuring the UE to utilize an active mode of processing during the one of the scheduled OnDurations and when a WUS is not received in the WUS opportunity for one of the scheduled OnDurations, configuring the UE to utilize a sleep mode of inactivity during the one of the scheduled OnDurations.

In other exemplary embodiments, a method is performed by a network component. The method includes establishing a connection to a user equipment (UE) that includes discontinuous reception (DRX) cycles, each DRX cycle including a scheduled OnDuration and a wake up signal (WUS) opportunity corresponding to each of the scheduled OnDurations, configuring a schedule comprising a first set of scheduled OnDurations and a second set of scheduled OnDurations and transmitting the schedule to the UE.

DETAILED DESCRIPTION

Figure 1:
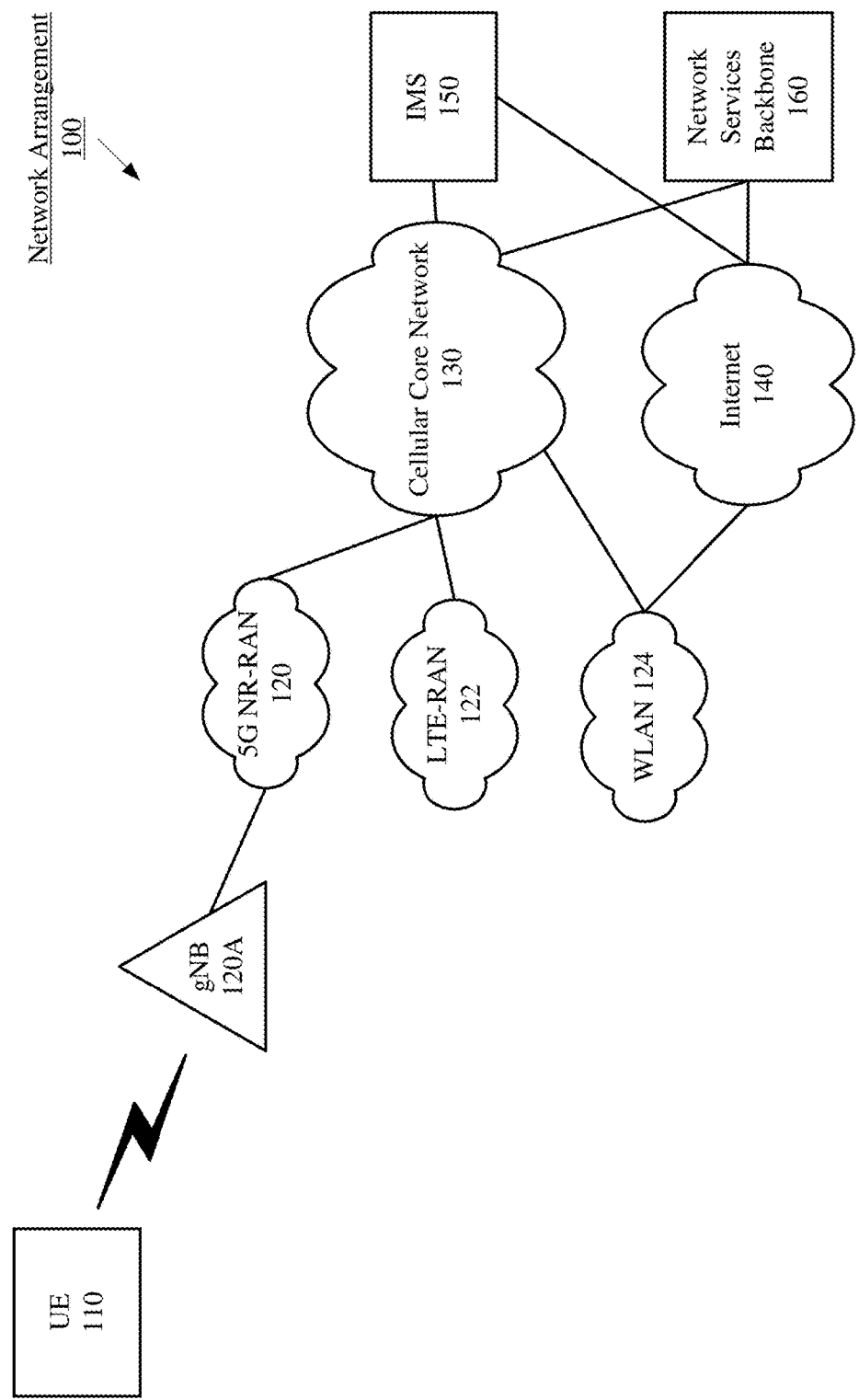
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method to improve wake-up signaling between a network and a UE. The exemplary embodiments provide the network and UE with mechanisms to handle situations related to misdetections of wake-up signals.

The exemplary embodiments are described with regard to a user equipment (UE). However, the use of a UE is provided for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component that is capable of beamforming.

The exemplary embodiments are described with regard to the network being a 5G New Radio (NR) network and a base station being a next generation Node B (gNB). The 5G NR network may utilize discontinuous reception cycle (DRX) and a corresponding wake-up signal (WUS) that is sent on the physical downlink control channel (PDCCH). However, the use of the 5G NR network, the gNB, the DRX cycle and the PDCCH-WUS are provided for illustrative purposes. The exemplary embodiments may apply to any type of network that utilizes a discontinuous reception cycle with a wake-up signal.

The DRX cycle is a power saving mechanism that includes utilizing an active mode of data exchange processing and a sleep mode of inactivity. The UE may use the active mode of processing at defined intervals to perform scheduled operations such as performing measurements related to the network conditions, transmitting (e.g., requests, measurement reports, uplink data etc.), and receiving (e.g. control channel information, reference signals, synchronization signals, downlink data, etc.). The time period that the UE may be scheduled to receive control channel information may be termed the OnDuration for the DRX cycle. The OnDuration relates to a duration over which the UE may perform operations that enable the UE to receive data that may be transmitted to the UE such as but not limited to, control channel information, an uplink grant, a downlink grant, reference signals, synchronization signals, payload data etc. During the DRX cycle, when an OnDuration is not scheduled the UE may have an opportunity to utilize the sleep mode of inactivity and conserve power. However, reference to a DRX cycle is for illustrative purposes, different networks may refer to similar concepts by a different name. The exemplary embodiments may apply to any scenario in which the UE transitions between a power saving mode and an active mode with regard to data exchange processing.

The DRX cycle may have a predetermined duration N such as 100 milliseconds (ms), 50 ms, 40 ms, 20 ms, etc. For example, at a time 0, there may be a OnDuration during which the active mode of processing is used. Subsequently, upon the conclusion of the OnDuration, the UE has an opportunity to utilize the sleep mode of inactivity. Then at a time N, there may be another OnDuration. Subsequently, the sleep mode is used until a time 2N. This process continues for the duration of the DRX cycle. Reference to the sleep mode of inactivity does not necessarily mean putting the processor, the transmitter, and the receiver of the UE to sleep, in hibernation, or in deactivation. For example, the processor (e.g., baseband and/or application) may continue to execute other applications or processes. The sleep mode relates to conserving power by discontinuing a continuous processing functionality relating to operations that enable the UE to receive data that may be transmitted to the UE and transmit data to the network. Further, reference to the DRX cycle being configured in ms units is merely for illustrative purposes, the exemplary embodiments may utilize a DRX cycle that is based on subframes or any other suitable unit of time.

As described above, the 5G NR network may utilize a further mechanism for the UE to save power. This mechanism may be the use of a WUS. The WUS is sent at a predetermined time before the next OnDuration. If the 5G NR network wants the UE to monitor the PDCCH during the next OnDuration, the 5G NR network will send the WUS. In response, the UE will wake up and monitor the PDCCH during the next OnDuration. If the 5G NR network does not need the UE to monitor the PDCCH during the next OnDuration, the 5G NR network will not send the WUS. In response, the UE will skip waking up for the next OnDuration. There may be instances where the 5G NR network sends the WUS, but the UE does not detect the WUS. Throughout this description, this scenario may be termed WUS misdetection by the UE. When a WUS misdetection occurs, the UE will not wake up for the next OnDuration in the same manner as if the WUS was not sent by the 5G NR network. However, since the 5G NR network sent the WUS and wanted the UE to wake up, the UE may miss a downlink (DL) data scheduling opportunity, which could lead to a connection loss.

There may be circumstances when the UE may wake up during an OnDuration even if the WUS is not received. For example, if the UE has uplink (UL) data to send to the network, the UE may wake up for the OnDuration to send a scheduling request (SR) and/or receive a UL grant in response to the SR. However, if this type of circumstance does not occur and a WUS misdetection occurs, the UE will not wake up for the next OnDuration. In one scenario, if the UE does not wake up when the network wants the UE to be awake to monitor the PDCCH, the network cannot successfully transmit signals and/or commands to modify the UE's configuration based on radio quality conditions. This may result in a radio link failure (RLF) being declared and a UE connection reestablishment procedure being triggered. Thus, the WUS that is designed to save power and resources, may result in the UE and the network expending additional power and resources to perform the reconnection when a WUS misdetection occurs. Those skilled in the art will understand that there may be other scenarios that result in a loss of connection or other type of failure mode if the UE fails to wake up for an OnDuration for which the network desires the UE to wake up.

The exemplary embodiments relate to improving a DRX cycle that includes the UE being woken up by a WUS. The exemplary embodiments include various manners of improving the DRX cycle to account for WUS misdetections including scheduling always-on OnDurations, falling back to legacy operations, scheduling uplink transmissions in selected OnDurations, multiple repetitions of WUSs, determining WUS misdetections have occurred, and configuring default UE behavior to handle WUS misdetections. Each of these exemplary embodiments will be described in greater detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
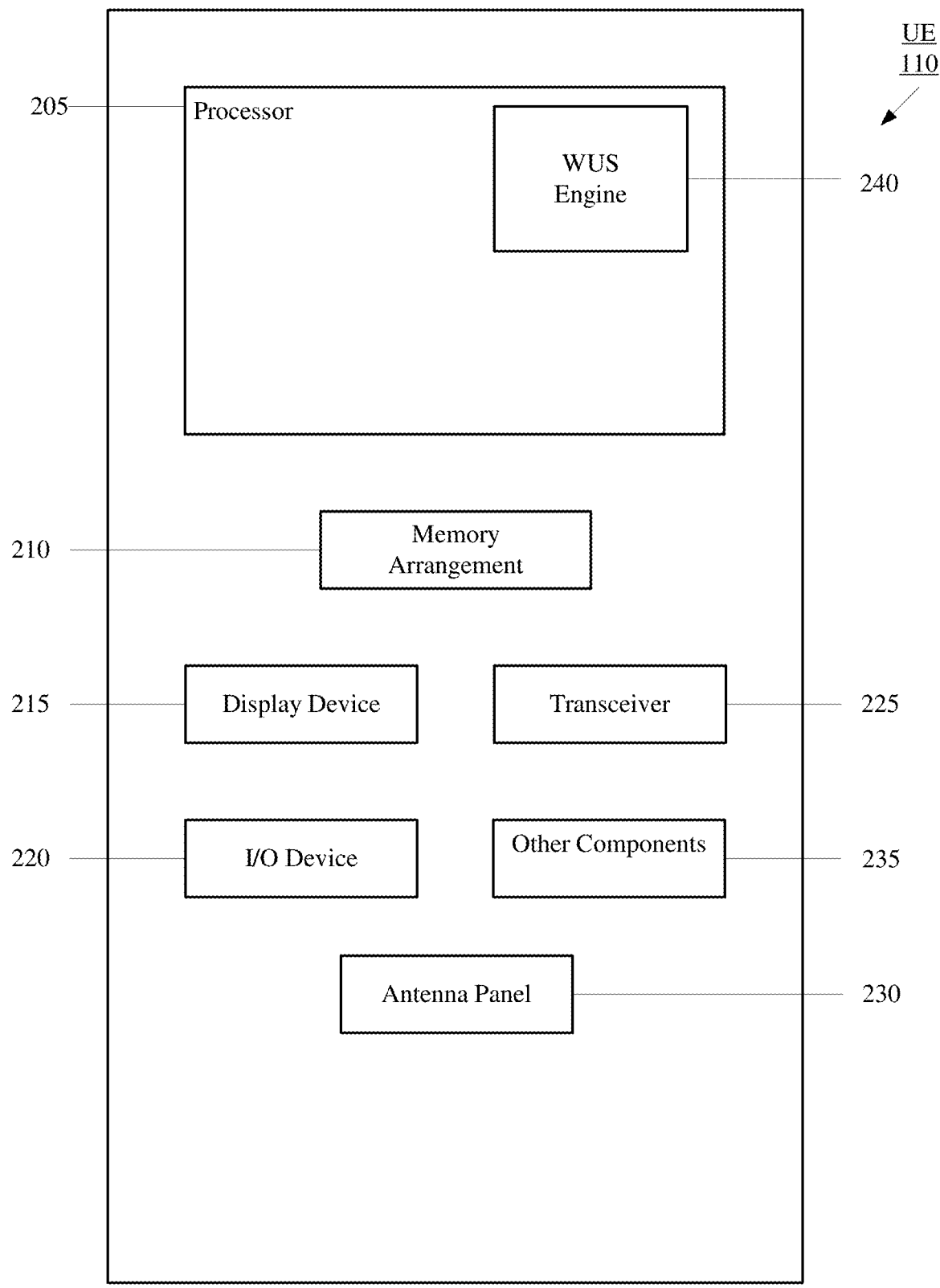
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, an antenna panel 230 and other components 235. The other components 235 may include, for example, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include a WUS engine 240. The WUS engine 240 may be configured to perform operations associated with detection and misdetection of a WUS that is sent by the 5G NR-RAN 120.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
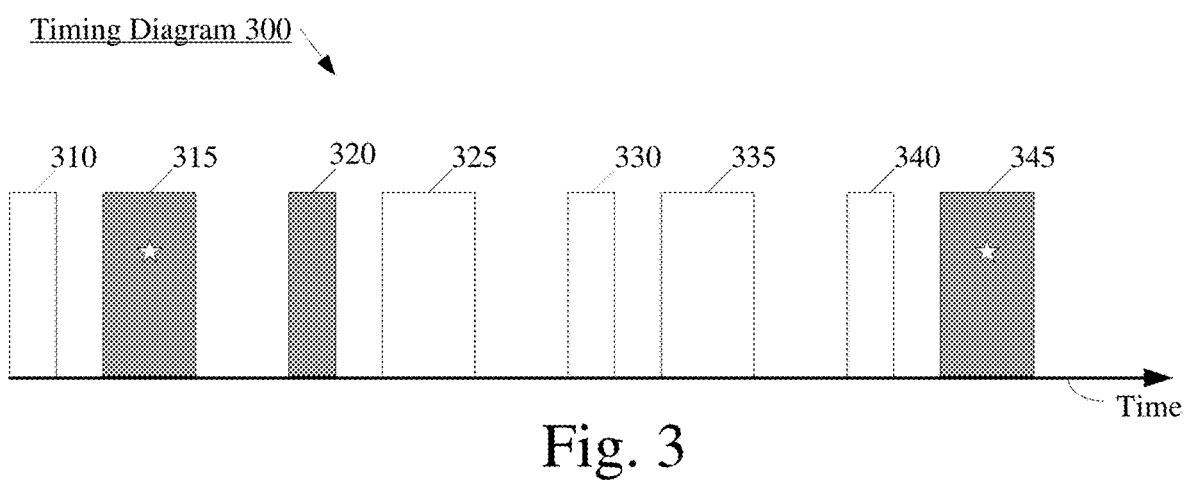
FIG. 3 shows an exemplary timing diagram for the UE operating in a DRX cycle including regularly scheduled always-on OnDurations according to various exemplary embodiments.

FIG. 3 shows an exemplary timing diagram 300 for the UE 110 operating in a DRX cycle including regularly scheduled always-on OnDurations. FIG. 3 will be described with regard to the network arrangement 100 of FIG. 1 and the UE 110 of FIG. 2. As will be described in greater detail below, the always-on OnDurations will provide for the UE 110 to wake up and perform operations that may have been missed because of one or more WUS misdetections.

The timing diagram 300 shows portions of four (4) DRX cycles of the UE 110. A first DRX cycle includes a WUS opportunity 310 and a corresponding OnDuration 315. As described above, the WUS opportunity 310 will occur at a predetermined offset (e.g., a predetermined time before) the corresponding OnDuration 315. The WUS opportunity 310 is described as an opportunity because, as described above, the 5G NR-RAN 120 may or may not send the WUS during the WUS opportunity 310 depending on whether the 5G NR-RAN wants the UE 110 to wake up during the OnDuration 315. Throughout this description and the corresponding figures, if the 5G NR-RAN sends the WUS during the WUS opportunity, the WUS opportunity will be presented as shaded. Correspondingly, if the UE 110 wakes up for an OnDuration, the OnDuration will be shaded. The second through fourth DRX cycles show WUS opportunities 320, 330 and 340 and corresponding OnDurations 325, 335 and 345, respectively.

In this exemplary embodiment, the 5G NR-RAN 120 may schedule always-on OnDurations in the DRX cycle for the UE 110. An always-on OnDuration may be an OnDuration where the UE 110 will wake up whether or not the UE 110 receives a WUS. In one exemplary embodiment, the always-on OnDuration may be scheduled based on a number (N) of DRX cycles, e.g., every third cycle, every fourth cycle, etc. As will be described in greater detail below, the example of FIG. 3 shows a DRX cycle with N=3, e.g., there is an always-on OnDuration every third DRX cycle. In other exemplary embodiments, the always-on OnDuration may be based on a timer, e.g., an always-on OnDuration is scheduled every N milliseconds.

In the example of FIG. 3, it may be considered that the 5G NR-RAN 120 has configured the DRX cycle of the UE 110 to have an always-on OnDuration every third DRX cycle, e.g., N=3. It may be considered that OnDuration 315 is one of the always-on OnDurations as denoted by the star in the OnDuration 315. Since N=3 in this example, the third OnDuration after OnDuration 315 will also be an always-on OnDuration, e.g., On-Duration 345 is an always-on OnDuration as also denoted by the star.

Consider the following scenario with respect to FIG. 3. At WUS opportunity 310, the 5G NR-RAN 120 does not send a WUS because the 5G NR-RAN 120 does not require the UE 110 to wake up during the corresponding OnDuration 315. However, since the On-Duration 315 is an always-on OnDuration, the UE 110 will wake up during this OnDuration 315. At WUS opportunity 320, the 5G NR-RAN 120 sends a WUS because the 5G NR-RAN 120 wants the UE 110 to wake up during the corresponding OnDuration 325. However, there may be a WUS misdetection for WUS opportunity 320 by the UE 110, resulting in the UE 110 not waking up for the OnDuration 325. Since the UE 110 did not wake up during OnDuration 325 when the 5G NR-RAN wanted the UE 110 to perform operations, the UE 110 may have missed various communications and/or monitoring information. At WUS opportunity 330, the 5G NR-RAN 120 does not send a WUS because the 5G NR-RAN 120 does not require the UE 110 to wake up during the corresponding OnDuration 335, and the UE 110 remains asleep during this OnDuration 335. At WUS opportunity 340, the 5G NR-RAN 120 does not send a WUS because the 5G NR-RAN 120 does not require the UE 110 to wake up during the corresponding OnDuration 345. However, since the On-Duration 345 is an always-on OnDuration, the UE 110 will wake up during this OnDuration 345.

In this exemplary scenario, even though the 5G NR-RAN 120 does not require the UE 110 to wake up during OnDuration 345, the UE 110 may wake up during this always-on OnDuration 345 and perform some or all of the operations that were missed during the OnDuration 325 when the UE 110 should have been awake but remained asleep. In this manner, the regularly scheduled always-on OnDurations may be used to compensate for WUS misdetections by the UE 110.

Figure 4:
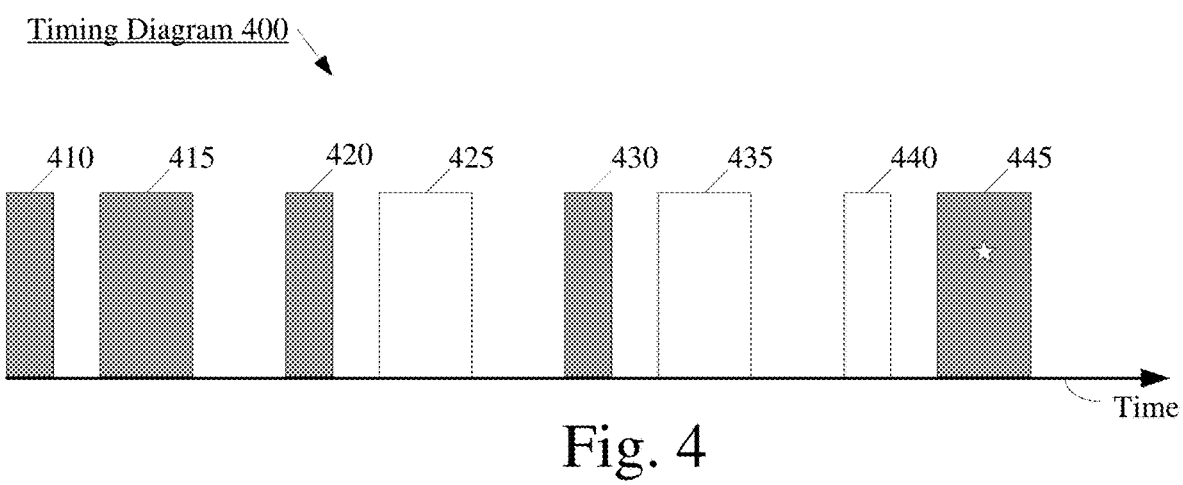
FIG. 4 shows a second exemplary timing diagram for the UE operating in a DRX cycle including always-on OnDurations based on a number of consecutive sleep cycles according to various exemplary embodiments.

FIG. 4 shows a second exemplary timing diagram 400 for the UE 110 operating in a DRX cycle including always-on OnDurations based on a number of consecutive sleep cycles according to various exemplary embodiments. FIG. 4 will be described with regard to the network arrangement 100 of FIG. 1 and the UE 110 of FIG. 2. In the example of FIG. 3, the always-on OnDurations were regularly scheduled, e.g., every N cycles. As will be described in greater detail below, in the example of FIG. 4, the always-on OnDurations are not regularly scheduled but are based on the UE 110 being asleep for a number (N) of consecutive OnDurations. Similar to the example of FIG. 3, the always-on OnDurations will provide for the UE 110 to wake up and perform operations that may have been missed because of one or more WUS misdetections.

The timing diagram 400 shows portions of four (4) DRX cycles of the UE 110. Each of the DRX cycles include a WUS opportunity 410, 420, 430, 440 and a corresponding OnDuration 415, 425, 435, 445. In this exemplary embodiment, it may be considered that the 5G NR-RAN 120 may configure the UE 110 to perform an always-on OnDuration when the UE 110 has been asleep for two (2) consecutive OnDurations.

Consider the following scenario with respect to FIG. 4. At WUS opportunity 410, the 5G NR-RAN 120 sends a WUS, the UE 110 detects the WUS 410 and wakes up during the corresponding OnDuration 415 to perform the desired operations. At WUS opportunity 420, the 5G NR-RAN 120 sends a WUS but the UE 110 mis-detects the WUS 420 and does not wake up during the corresponding OnDuration 425. Similarly, at WUS opportunity 430, the 5G NR-RAN 120 sends a WUS but the UE 110 mis-detects the WUS 430 and does not wake up during the corresponding OnDuration 435.

Thus, in this scenario, the UE 110 has remained asleep for two (2) consecutive OnDurations. Because the 5G NR-RAN 120 has configured the UE 110 to perform an always-on OnDuration after two (2) consecutive OnDurations where the UE 110 has remained asleep, the OnDuration 445 will be an always-on OnDuration (denoted by the star) and the UE 110 will wake up for OnDuration 445 regardless of whether the WUS opportunity 440 includes a WUS or not. In this manner, the always-on OnDurations based on the number of consecutive sleep OnDurations may be used to compensate for WUS misdetections by the UE 110, e.g., the WUS misdetections related to WUS opportunities 420 and 430.

It should be understood that in the exemplary scenario of FIG. 4, the 5G NR-RAN 120 may not have sent a WUS in either WUS opportunities 420 or 430. However, in this example, the UE 110 may still perform the always-on OnDuration 445 because the UE 110 remained asleep for OnDurations 425 and 435, e.g., for two (2) consecutive OnDurations. Those skilled in the art will also understand that the example of two (2) consecutive OnDurations is only an example and the number (N) of consecutive OnDurations may be set to any integer value.

In the above examples of FIGS. 3 and 4, the operation of the UE 110 with respect to the DRX cycles that included always-on OnDurations was described. It was described that the 5G NR-RAN 120 configured the DRX cycles of the UE 110. Thus, in these examples, the 5G NR-RAN will understand the operation of the UE 110 with respect to the DRX cycles and when there should be always-on OnDurations, e.g., every N cycles, every N milliseconds, after N consecutive sleeping OnDurations, etc. Thus, if the 5G NR-RAN 120 does not receive a response according to the scheduling (e.g., PDCCH scheduling) after sending a WUS, the 5G NR-RAN 120 may assume that WUS misdetections may have occurred for the UE 110. Furthermore, because the 5G NR-RAN 120 will understand when the next always-on OnDuration will occur, the 5G NR-RAN 120 may postpone communications (e.g., scheduling) with the UE 110 until the next always-on OnDuration.

Figure 5:
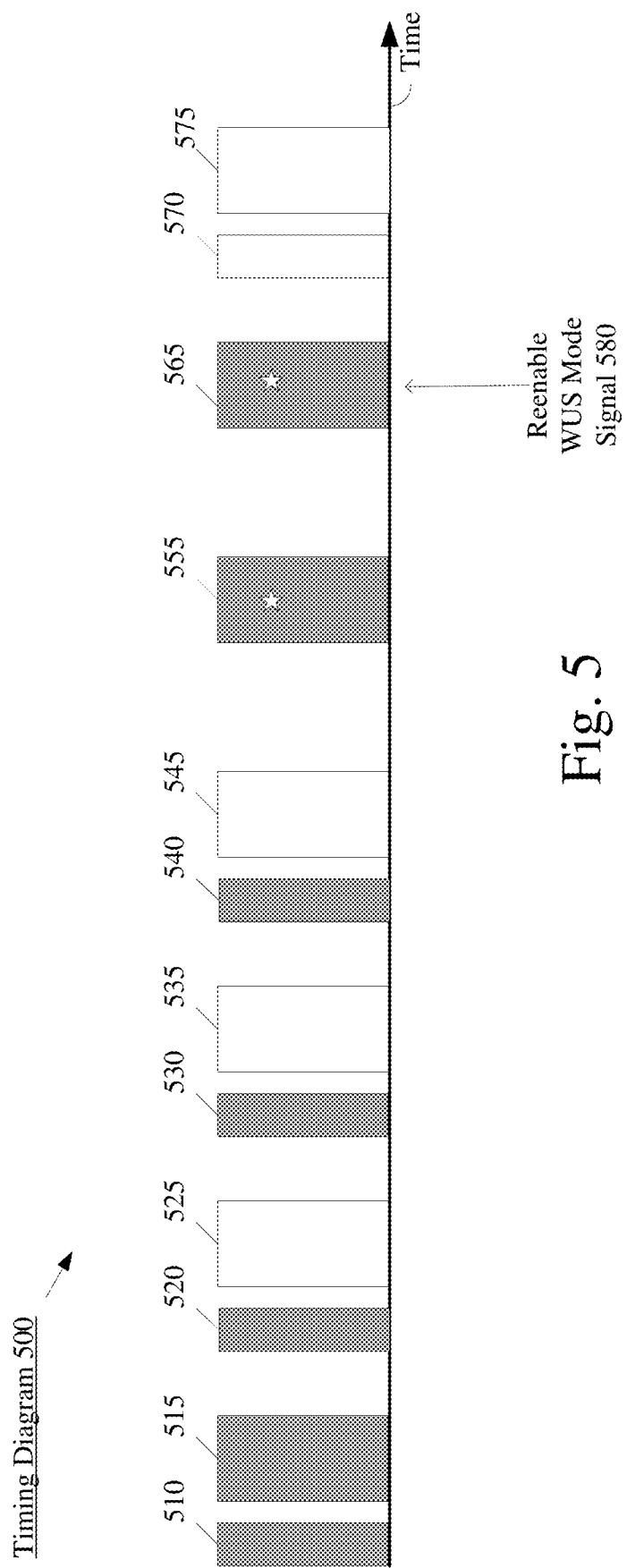
FIG. 5 shows a third exemplary timing diagram for the UE operating in a DRX cycle including a fall back to legacy operation based on a number of consecutive sleep cycles according to various exemplary embodiments.

FIG. 5 shows a third exemplary timing diagram 500 for the UE 110 operating in a DRX cycle including a fall back to legacy operation based on a number of consecutive sleep cycles according to various exemplary embodiments. Similar to the exemplary embodiment of FIG. 4, the exemplary embodiment of FIG. 5 will cause the UE 110 to perform an action when the UE 110 remains asleep for N consecutive OnDurations. The action in this example, is a fallback to legacy operations with respect to the DRX cycle. Legacy operations refer to a DRX cycle for network operations and UE operations that do not include a WUS. That is, if the network does not include a WUS, the UE 110 will wake up for every OnDuration. Thus, in legacy operation, all OnDurations may be considered to be always-on OnDurations because the UE 110 will wake up for all scheduled OnDurations.

In the example of FIG. 5, it may be considered that the UE 110 and the 5G NR-RAN 120 are initially operating in a WUS mode, e.g., the 5G NR-RAN 120 is sending a WUS when the UE 110 is to wake up for an OnDuration. It may also be considered that the 5G NR-RAN 120 may configure the UE 110 to fall back to legacy operations when the UE 110 has been asleep for three (3) consecutive OnDurations. Consider the following scenario with respect to FIG. 5. At WUS opportunity 510, the 5G NR-RAN 120 sends a WUS, the UE 110 detects the WUS 510 and wakes up during the corresponding OnDuration 515 to perform the desired operations. However, at WUS opportunities 520, 530, 540, the 5G NR-RAN 120 sends a WUS but a WUS misdetection occurs for each of the WUS opportunities 520, 530, 540 and the UE 110 does not wake up during the corresponding OnDurations 525, 535, 545. Because the 5G NR-RAN 120 has configured the UE 110 to fall back to legacy operations after three (3) consecutive OnDurations where the UE 110 has remained asleep, the UE 110 will fall back to legacy operations after OnDuration 545. Thus, operating in legacy operation mode, the UE 110 will wake up during OnDurations 555 and 565 because, as described above, legacy operations result in every OnDuration being an always-on OnDuration.

In this manner, the fallback to legacy operations based on the number of consecutive sleep OnDurations may be used to compensate for WUS misdetections by the UE 110, e.g., the WUS misdetections related to WUS opportunities 520-540. Again, the example of three (3) consecutive OnDurations is only an example and the number (N) of consecutive OnDurations may be set to any integer value. In addition, while there are no WUS opportunities shown in FIG. 5 that correspond to the OnDurations 555 and 565, the 5G NR-RAN 120 may still send WUSs in the corresponding WUS opportunities. However, these WUSs will be irrelevant because the UE 110 will not monitor for the WUSs in legacy mode because the UE 110 will wake up in each OnDuration. In addition, while the example of FIG. 5 has been described as being based on a number of consecutive OnDurations for which the UE 110 remains asleep, the fall back to legacy operations may also be based on a timer. For example, UE 110 may start a timer after a last OnDuration where the UE 110 was awake and if the timer expires before another OnDuration where the UE 110 is awake, the UE 110 may fall back to legacy operation based on the expiration of the timer.

However, because the WUS mode offers more power and resource savings for the UE 110 and/or the 5G NR RAN 120, it may be desired that operations return to WUS mode after being in legacy mode. When operating in WUS mode, e.g., during the DRX cycles including OnDurations 515-545, it may be considered that the 5G NR-RAN 120 will wake up the UE 110 every N OnDurations (or before expiration of a timer as described above). If the UE 110 does not wake up during the N OnDurations (or before expiration of the timer), the 5G NR-RAN 120 may assume that the UE 110 has fallen back to legacy mode. The 5G NR-RAN 120 may determine that the UE 110 did not wake up during the N OnDurations (or before expiration of the timer) because the 5G NR-RAN did not receive any communications from the UE 110 during this period. Thus, once the 5G NR-RAN determines that the UE 110 is operating in legacy mode, the 5G NR-RAN may reenable the WUS mode by signaling the UE 110 to resume WUS mode operation. This signaling may be, for example, a layer 1 or layer 2 signal that is sent from the 5G NR-RAN 120 to the UE 110 during an OnDuration. In the example of FIG. 5, the reenable WUS mode signal 580 is shown as being sent during OnDuration 565. This causes the UE 110 to continue operations in the WUS mode for the next DRX cycle as shown by WUS opportunity 570 and corresponding OnDuration 575.

Again, any missed operations by the UE 110 because of the misdetections on WUSs 520-540 should be mitigated because of the legacy operation causing the UE 110 to be awake for OnDurations 555 and 565. Thus, return to WUS mode during the DRX cycle including OnDuration 575 should not present any issue with respect to a failed connection between the 5G NR-RAN 120 and the UE 110.

Figure 6:
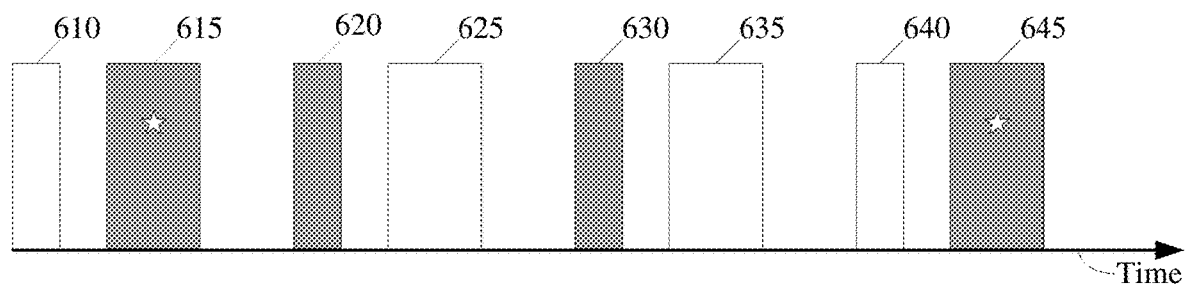
FIG. 6 shows a fourth exemplary timing diagram for the UE operating in a DRX cycle including a regularly scheduled uplink operation for the UE according to various exemplary embodiments.

FIG. 6 shows a fourth exemplary timing diagram 600 for the UE 110 operating in a DRX cycle including a regularly scheduled uplink operation for the UE 110 according to various exemplary embodiments. As described above, if the UE 110 has UL data to send to the 5G NR-RAN 120, the UE will wake up to send a SR to receive a UL grant during an OnDuration regardless of whether a WUS is received or not. Similarly, if the UE 110 is scheduled to send a transmission to the network during a next OnDuration, the UE 110 will wake up for that OnDuration whether or not a WUS is received from the network. Thus, in this exemplary embodiment, the 5G NR-RAN 120 may schedule periodic UL transmissions for the UE 110 to perform every N DRX cycles to assure that the UE 110 wakes up every N DRX cycles to send the scheduled UL transmission. The UL transmissions may be any type that the UE 110 sends to the 5G NR-RAN. For example, the UL transmission may include a Channel Status Information (CSI) report, a Sounding Reference Signal (SRS), etc.

FIG. 6 shows an example of when the 5G NR-RAN 120 schedules such mandatory UL transmissions signals for the UE 110. The timing diagram 600 shows portions of four (4) DRX cycles of the UE 110. Each of the DRX cycles include a WUS opportunity 610, 620, 630, 640 and a corresponding OnDuration 615, 625, 635, 645. In this exemplary embodiment, it may be considered that the 5G NR-RAN 120 may configure the UE 110 to send a UL transmission every N OnDuration (N=3). Thus, the UE 110 will wake up every N OnDuration because it is scheduled to send the UL transmission. Because the UE 110 is awake to send the UL transmission, the UE 110 may also receive transmissions from the 5G NR-RAN 120 and perform other operations as requested by the 5G NR-RAN 120.

Consider the following scenario with respect to FIG. 6. At WUS opportunity 610, the 5G NR-RAN 120 does not send a WUS because the 5G NR-RAN 120 does not require the UE 110 to wake up during the corresponding OnDuration 615. However, because the 5G NR-RAN 120 has scheduled a UL transmission for the UE 110 during the OnDuration 615, the UE 110 will wake up. Thus, the OnDuration is similar to an always-on OnDuration as described above because the UE 110 will wake up regardless of whether a corresponding WUS has been received or not. At WUS opportunities 620 and 630, the 5G NR-RAN 120 sends a WUS but WUS misdetections occur and the UE 110 does not wake up during the corresponding OnDurations 625 and 635. At WUS opportunity 640, the 5G NR-RAN 120 does not send a WUS, but the UE 110 will wake up for the OnDuration 645 because a UL transmission is scheduled for the OnDuration 645. In this manner, the wake up based on a scheduled UL transmission may be used to compensate for WUS misdetections by the UE 110, e.g., the WUS misdetections related to WUS opportunities 620 and 630.

Figure 7:
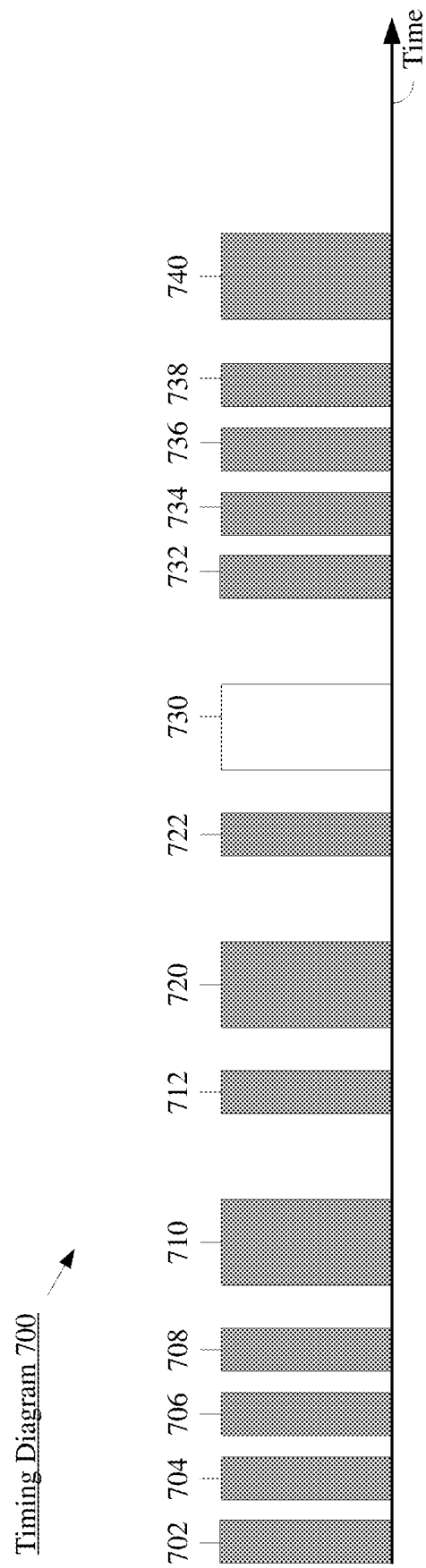
FIG. 7 shows a fifth exemplary timing diagram for the UE operating in a DRX cycle including WUS repetitions that are sent by the network according to various exemplary embodiments.

FIG. 7 shows a fifth exemplary timing diagram 700 for the UE 110 operating in a DRX cycle including WUS repetitions that are sent by the network according to various exemplary embodiments. In the previous exemplary embodiments, it was considered that the 5G NR-RAN 120 transmitted a single WUS during the WUS opportunity corresponding to an OnDuration. In the present exemplary embodiment, the 5G NR-RAN 120 may transmit multiple WUSs corresponding to a single OnDuration. Thus, even if there are multiple WUS misdetections by the UE 110, the UE 110 may still wake up for the corresponding OnDuration if even a single one of the WUSs is received. In this manner, it is more likely that the UE 110 will wake up when the 5G NR-RAN 120 wants the UE 110 to wake up because a single WUS misdetection will not prevent the UE 110 from waking up.

In one exemplary embodiment, the 5G NR-RAN may configure the number (N) of repetitions of the WUS to be the same for every DRX cycle. For example, the 5G NR-RAN 120 may configure the number of repetitions to be four (4) WUS transmissions for every DRX cycle. However, the number N may be any integer value. In another exemplary embodiment, the number N of repetitions may be based on a quality of the channel between the UE 110 and the 5G NR-RAN 120 (e.g., gNB 120A). The UE 110 may report channel quality to the gNB 120A or the channel quality may be determined by the 5G NR-RAN 120 based on signals received from the UE 110. Various quality thresholds may be set and depending on the quality of the connection, the 5G NR-RAN 120 may determine the number of repetitions during each DRX cycle or for a set of consecutive DRX cycles. It should be understood that the UE 110 may monitor for the WUS during the scheduled WUS opportunities, but once a WUS has been detected for a particular DRX cycle, the UE 110 may skip or omit monitoring for additional WUSs for that DRX cycle because the UE 110 has already determined that the UE 110 should be awake for the corresponding OnDuration.

The timing diagram 700 shows portions of four (4) DRX cycles of the UE 110. The first DRX cycle includes four (4) WUS opportunities 702-708. In this example, the 5G NR-RAN transmits a WUS during each of these WUS opportunities 702-708. It may also be considered that the UE 110 received at least one of these WUSs 702-708 because the UE 110 wakes up during the corresponding OnDuration 710. During the second DRX cycle, it may be considered that the 5G NR-RAN has determined that the quality of the connection between the UE 110 and the gNB 120A is of a sufficient quality that only a single WUS is to be transmitted. Thus, the second DRX cycle includes a single WUS opportunity 712. The UE 110 detects the WUS transmitted during WUS opportunity 712 and wakes up for the corresponding OnDuration 720. The third DRX cycle includes a single WUS opportunity 722. However, in this example, there is a WUS misdetection by the UE 110 and the UE 110 does not wake up during the corresponding OnDuration 730. The 5G NR-RAN 120 may determine that a WUS misdetection occurred for the WUS 722 (e.g., based on the UE 110 not responding to a request of the 5G NR-RAN 120 during the OnDuration 730) and increase the number of WUSs for the next DRX cycle. In this example, the 5G NR-RAN 120 increased the number of WUS opportunities 732, 734, 736, 738 back to four (4) during the fourth DRX cycle in response to the WUS misdetection of WUS opportunity 722. In another example, the increase may also be based on a decrease in the quality of the connection or a combination of these factors (e.g., misdetection and signal quality).

Figure 8:
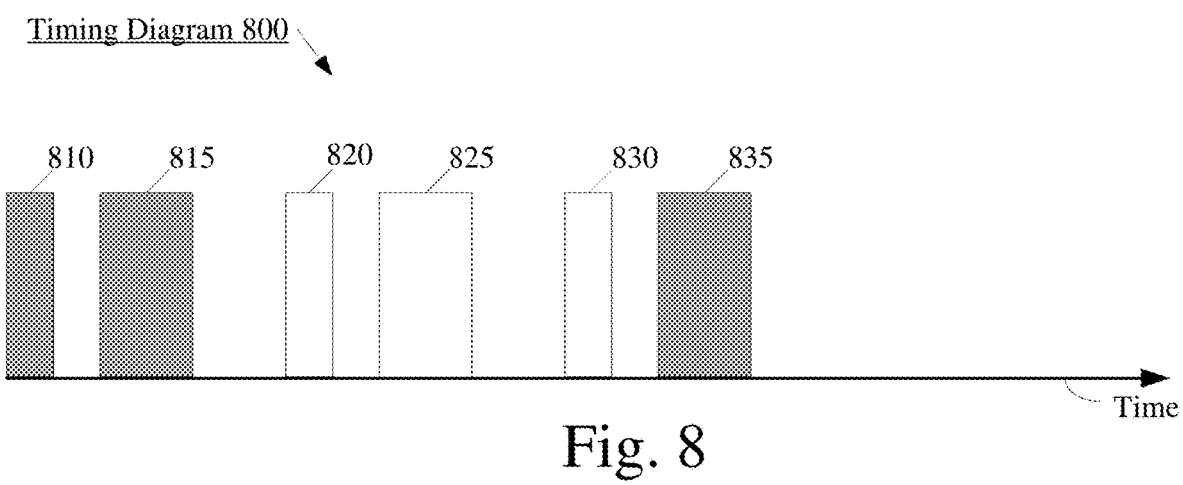
FIG. 8 shows a sixth exemplary timing diagram for the UE operating in a DRX cycle including the UE identifying WUS misdetections according to various exemplary embodiments.

FIG. 8 shows a sixth exemplary timing diagram 800 for the UE 110 operating in a DRX cycle including the UE 110 identifying WUS misdetections according to various exemplary embodiments. In this exemplary embodiment, the UE 110 may determine whether there has been a WUS misdetection based on a channel quality between the UE 110 and the 5G NR-RAN 120 (e.g., gNB 120A). Based on this determination, the UE 110 may wake up for an OnDuration even if the UE 110 did not receive a corresponding WUS.

The timing diagram 800 shows portions of three (3) DRX cycles of the UE 110. Each of the DRX cycles include a WUS opportunity 810, 820, 830 and a corresponding OnDuration 815, 825, 835. Consider the following scenario with respect to FIG. 8. At WUS opportunity 810, the 5G NR-RAN 120 sends a WUS, the UE 110 detects the WUS 810 and wakes up during the corresponding OnDuration 815 to perform the desired operations.

At WUS opportunity 820, the UE 110 does not detect a WUS. However, the UE 110 is unaware if the 5G NR-RAN 120 sent a WUS and there was a misdetection or if the 5G NR-RAN 120 did not send a WUS. In this exemplary embodiment, the UE 110 will use a channel quality to determine if there was a WUS misdetection. The channel quality may be based on, for example, a layer 1 or a layer 3 quality indication. As described above, the quality indication may be determined by the UE 110 or the 5G NR-RAN 120. When the UE 110 does not receive a WUS during a WUS opportunity, the UE 110 may compare the channel quality to a channel quality threshold. The channel quality threshold may be set by the 5G NR-RAN 120 or the UE 110. If the channel quality is greater than the threshold, the UE 110 may determine that no WUS was detected because no WUS was transmitted by the 5G NR-RAN 120. In the example of the DRX cycle including the OnDuration 825 of FIG. 8, it may be determined that a WUS was not detected during WUS opportunity 820 because the 5G NR-RAN 120 did not send a WUS. This determination may be based on the channel quality being above the channel quality threshold.

Again, at WUS opportunity 830, the UE 110 does not detect a WUS. However, at this time, the UE 110 may determine that the channel quality is less than the channel quality threshold. This may cause the UE 110 to determine that the WUS was not received because there was a WUS misdetection. In response to determining a WUS misdetection, the UE 110 may wake up for the corresponding OnDuration 835 even though the WUS was not detected because the UE 110 has determined that there is a likely WUS misdetection. In this manner, the UE 110 can independently determine whether to wake up for an OnDuration, even if the UE 110 did not receive a WUS for the OnDuration.

Figure 9:
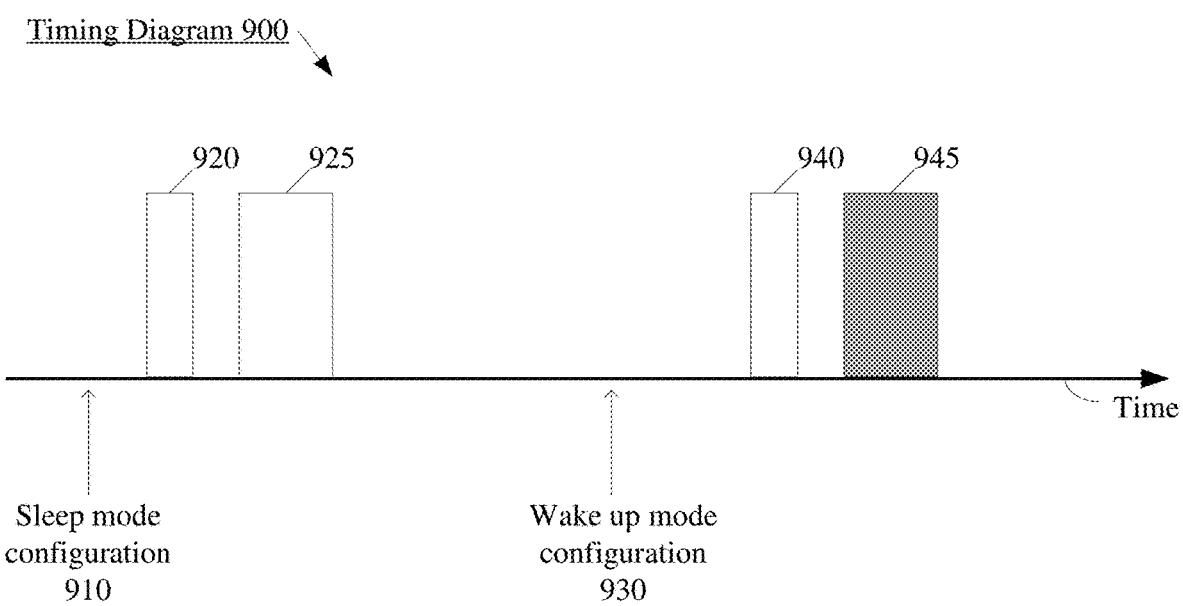
FIG. 9 shows a seventh exemplary timing diagram for the UE operating in a DRX cycle including the UE identifying WUS misdetections and operating in a sleep/wake-up mode according to various exemplary embodiments.

FIG. 9 shows a seventh exemplary timing diagram 900 for the UE 110 operating in a DRX cycle including the UE 110 identifying WUS misdetections and operating in a sleep/wake-up mode according to various exemplary embodiments. Exemplary manners of the UE 110 determining if there is a WUS misdetection have been described above with reference to FIG. 8. In this example, it may be considered that the UE 110 may determine a WUS misdetection based on the manners described above or any other manner of determining a WUS misdetection. In this exemplary embodiment, the UE 110 may further include an operating mode with respect to WUS misdetections. A first operating mode may be described as a sleep mode where the UE 110 may default to remaining asleep during a corresponding OnDuration when a WUS misdetection is determined. A second operating mode may be described as a wake-up mode where the UE 110 may default to waking up during a corresponding OnDuration when a WUS misdetection is determined. The operating modes may be configured by the 5G NR-RAN 120 via, for example, layer 1, layer 2 or layer 3 signaling.

In a first instance, the UE 110 may receive a sleep mode configuration message 910 from the 5G NR-RAN 120. The UE 110 will be configured to sleep mode. As described above, sleep mode will cause the UE 110 to remain asleep during a corresponding OnDuration when a WUS misdetection is determined. It may be considered that in a DRX cycle when the UE 110 is in sleep mode, the UE 110 may determine that there is a WUS misdetection for the WUS opportunity 920. As described above, this WUS misdetection may be based on not receiving a WUS when the channel quality is below a threshold. Because the UE 110 is in sleep mode, the UE 110 will not wake up during the corresponding OnDuration 925. In another exemplary embodiment, the UE 110 may wake up even in sleep mode based on an implementation of the UE 110. For example, because the sleep mode was set by the network (e.g., 5G NR-RAN 120), the UE 110 may locally override the network instructions to wake up for the OnDuration when a WUS misdetection is determined.

At a later time, the UE 110 may receive a wake-up mode configuration message 930 from the 5G NR-RAN 120. The UE 110 will be configured to wake-up mode. As described above, wake-up mode will cause the UE 110 to wake-up during a corresponding OnDuration when a WUS misdetection is determined. It may be considered that in a DRX cycle when the UE 110 is in wake-up mode, the UE 110 may determine that there is a WUS misdetection for the WUS opportunity 940. As described above, this WUS misdetection may be based on not receiving a WUS when the channel quality is below a threshold. Because the UE 110 is in wake-up mode, the UE 110 will wake up during the corresponding OnDuration 945. As described above, the 5G NR-RAN 120 may dynamically switch the UE 110 between sleep mode and wake-up mode depending on various factors.

Figure 10:
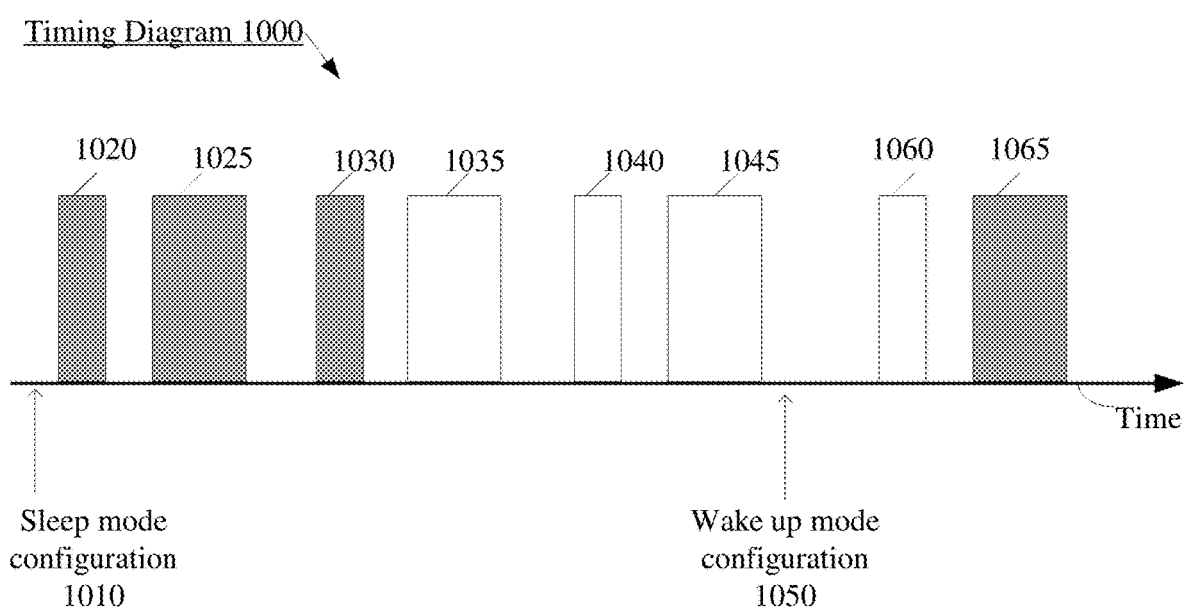
FIG. 10 shows an eighth exemplary timing diagram for the UE operating in a DRX cycle and receiving explicit WUS indications, wherein the UE identifies WUS misdetections and operates in a sleep/wake-up mode according to various exemplary embodiments.

FIG. 10 shows an eighth exemplary timing diagram 1000 for the UE 110 operating in a DRX cycle and receiving explicit WUS indications, wherein the UE 110 identifies WUS misdetections and operates in a sleep/wake-up mode according to various exemplary embodiments. Examples of WUS misdetections and the general characteristics of the sleep and wake-up modes have been described above and are not repeated here. In the above examples, it was considered that the 5G NR-RAN 120 would send a WUS when the network desired the UE 110 to wake up for a corresponding OnDuration. In this example, it will be considered that the 5G NR-RAN 120 will send a WUS during every WUS opportunity but the WUS will have an explicit instruction for the UE 110. The explicit instruction will either be wake-up when the 5G NR-RAN 120 wants the UE 110 to be awake for the corresponding OnDuration or sleep when the 5G NR-RAN 120 does not require the UE 110 to wake up for the corresponding OnDuration.

In this exemplary embodiment, it may be considered that the WUS misdetection encompasses additional scenarios. For example, since the UE 110 expects to receive a WUS with an explicit instruction for every corresponding OnDuration, it may also be considered a WUS misdetection when the UE 110 does not receive a WUS as expected. In another example, the UE 110 may receive a communication when the WUS is expected but the UE 110 may not be able to properly decode the communication. For example, the WUS may include a CRC coding to check the communication and the communication may fail the CRC check. In such an instance, the UE 110 cannot decode the WUS and will not be sure if the WUS included an explicit sleep or wake-up signal. This decoding or error check failure may also be considered a WUS misdetection in this example. Accordingly, when describing a WUS misdetection in this example, the WUS misdetection may include additional failures as described by example herein.

In a first instance, the UE 110 may receive a sleep mode configuration message 1010 from the 5G NR-RAN 120, which will cause the UE 110 to be configured to sleep mode. As described above, sleep mode will cause the UE 110 to remain asleep during a corresponding OnDuration when a WUS misdetection is determined. It may be considered that in a first DRX cycle when the UE 110 is in sleep mode, the UE 110 may receive a WUS 1020 including an explicit wake-up instruction. Thus, the UE 110 will wake-up for the corresponding OnDuration 1025. In a second DRX cycle when the UE 110 is in sleep mode, the UE 110 may receive a WUS 1030 including an explicit sleep instruction. Thus, the UE 110 will remain asleep for the corresponding OnDuration 1035. In a third DRX cycle when the UE 110 is in sleep mode, the UE 110 may determine that there is a WUS misdetection for the WUS opportunity 1040. Because the UE 110 is in sleep mode, when there is a WUS misdetection, the UE 110 will not wake up during the corresponding OnDuration 1045. Again, in another exemplary embodiment, the UE 110 may wake up even in sleep mode based on an implementation of the UE 110. For example, because the sleep mode was set by the network (e.g., 5G NR-RAN 120), the UE 110 may locally override the network instructions to wake up for the OnDuration when a WUS misdetection is determined.

At a later time, the UE 110 may receive a wake-up mode configuration message 1050 from the 5G NR-RAN 120, which causes the UE 110 to be configured to wake-up mode. As described above, wake-up mode will cause the UE 110 to wake-up during a corresponding OnDuration when a WUS misdetection is determined. The operation of the UE 110 when there is a properly received WUS is the same as described above with respect to the sleep mode (e.g., an explicit sleep instruction will cause the UE 110 to remain asleep during the corresponding OnDuration and an explicit wake-up instruction will cause the UE 110 to wake up during the corresponding OnDuration). In a DRX cycle when the UE 110 is in wake-up mode, the UE 110 may determine that there is a WUS misdetection for the WUS opportunity 1060. Because the UE 110 is in wake-up mode, when there is a WUS misdetection, the UE 110 will wake up during the corresponding OnDuration 1065. As described above, the 5G NR-RAN 120 may dynamically switch the UE 110 between sleep mode and wake-up mode depending on various factors.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
at a user equipment (UE):
establishing a connection to a network that includes discontinuous reception (DRX) cycles, wherein each DRX cycle includes i) a scheduled OnDuration and ii) a wake up signal (WUS) opportunity corresponding to each of the scheduled OnDurationand iii) a time duration during which the UE is scheduled to perform an uplink transmission comprising a channel state information (CSI) report or a sounding reference signal (SRS);
when a WUS is received in the WUS opportunity for a first scheduled OnDuration, configuring the UE to utilize an active mode of processing during first scheduled OnDuration; and
when the WUS is not received in the WUS opportunity for the first scheduled OnDuration, configuring the UE to utilize a sleep mode of inactivity during the first scheduled OnDuration.

2. The method of claim 1, further comprising:
when the first scheduled OnDuration comprises an always-on OnDuration, configuring the UE to utilize the active mode of processing during the scheduled OnDuration with or without receiving the WUS in the WUS opportunity for the first scheduled onDuration.

3. The method of claim 2, wherein every N OnDuration comprises an always-on OnDuration, wherein Nis an integer greater than 1.

4. The method of claim 2, wherein the always-on OnDuration is determined based on a number of consecutive OnDurations for which the sleep mode of inactivity is configured.

5. The method of claim 1, further comprising:
when a predetermined number of consecutive OnDurations for which the sleep mode of inactivity is configured, configuring the UE to utilize the active mode of processing for a next scheduled OnDuration.

6. The method of claim 1, further comprising:
configuring the UE to perform an uplink transmission every N OnDuration, wherein Nis an integer greater than 1 and wherein the UE is configured to utilize the active mode of processing for an OnDurations during which the uplink transmission is performed.

7. The method of claim 1, wherein the WUS opportunity for each OnDuration comprises a plurality of WUS opportunities.

8. The method of claim 7, wherein a number of the plurality of WUS opportunities is based on at least a quality of the connection between the UE and the network.

9. The method of claim 1, further comprising:
when a WUS is not received by the UE during a second scheduled onDuration, determining a quality of the connection between the UE and the network; and
when the quality of the connection is below a predetermined threshold, determining that the WUS was sent by the network during the second scheduled onDuration.

10. The method of claim 9, further comprising:
performing, by the UE, corresponding operations as if the UE received the WUS during the second scheduled onDuration.

11. The method of claim 9, further comprising:
determining if the UE is in the sleep mode of inactivity or a wake-up mode;
when the UE is in the sleep mode, performing, by the UE, corresponding operations as if the UE did not receive the WUS; and
when the UE is in the wake-up mode, performing, by the UE, corresponding operations as if the UE received the WUS.

12. A method, comprising:
at a network component:
establishing a connection to a user equipment (UE) that includes discontinuous reception (DRX) cycles, wherein each DRX cycle includes i) a scheduled OnDuration, ii) a wake up signal (WUS) opportunity corresponding to each of the scheduled OnDuration and iii) a time duration during which the UE is scheduled to perform an uplink transmission comprising a channel state information (CSI) report or a sounding reference signal (SRS);
configuring a schedule comprising a first set of scheduled OnDurations and a second set of scheduled OnDurations; and
transmitting the schedule to the UE.

13. The method of claim 12, wherein the second set of OnDurations comprise always-on OnDurations.

14. The method of claim 12, further comprising:
determining the UE has disabled the schedule; and
signaling the UE to reenable the schedule.

15. The method of claim 12, wherein the second set of OnDurations comprise OnDurations that include uplink transmissions by the UE.

16. The method of claim 12, wherein the WUS opportunity for each OnDuration comprises a plurality of WUS opportunities.

17. The method of claim 16, wherein a number of the plurality of WUS opportunities is based on at least a quality of the connection between the UE and the network.

18. The method of claim 12, further comprising:
configuring the UE to operate in one of a sleep mode or a wake-up mode,
wherein the sleep mode causes the UE to be configured to utilize a sleep mode of inactivity during the one of the scheduled OnDurations when the network component transmitted a WUS and the UE did not receive the WUS, and
wherein the wake-up mode causes the UE to be configured to utilize an active mode of processing during the one of the scheduled OnDurations when the network component transmitted a WUS and the UE did not receive the WUS.

19. A user equipment (UE), comprising:
a transceiver configured to communicate with a network; and
a processor communicatively coupled to the transceiver and configured to perform operations comprising:
establishing a connection to a network that includes discontinuous reception (DRX) cycles, wherein each DRX cycle includes i) a scheduled OnDuration, ii) a wake up signal (WUS) opportunity corresponding to each of the scheduled OnDuration and iii) a time duration during which the UE is scheduled to perform an uplink transmission comprising a channel state information (CSI) report or a sounding reference signal (SRS);

when a WUS is received in the WUS opportunity for a first scheduled OnDuration, configuring the UE to utilize an active mode of processing during the first scheduled OnDuration; and when the WUS is not received in the WUS opportunity for the first scheduled OnDuration, configuring the UE to utilize a sleep mode of inactivity during the first scheduled OnDuration.

20. The UE of claim 19, wherein the operations further comprise:

configuring the UE to perform an uplink transmission every N OnDuration, wherein N is an integer greater than 1 and wherein the UE is configured to utilize the active mode of processing for the OnDurations for which an uplink transmission is performed.

* * * * *

UNITED STATES PATENT AND TRADEMARK OFFICE
CERTIFICATE OF CORRECTION

PATENT NO. : 12,389,323 B2
APPLICATION NO. : 17/755354
DATED : August 12, 2025
INVENTOR(S) : Xu et al.

Page 1 of 1

It is certified that error appears in the above-identified patent and that said Letters Patent is hereby corrected as shown below:

In the Claims

Claim 1, Column 15, Lines 17-18:
"ii) a wake up signal (WUS) opportunity correspond i ng to each of the scheduled OnDurationand iii)" should read as "ii) a wake up signal (WUS) opportunity corresponding to each of the scheduled OnDuration and iii)"

Claim 6, Column 15, Line 51:
"every N OnDuration, wherein Nis an integer greater" should read as "every N OnDuration, wherein N is an integer greater"

Claim 20, Column 17, Line 15:
"every N OnDuration, wherein Nis an integer greater" should read as "every N OnDuration, wherein N is an integer greater"

Signed and Sealed this
Twenty-third Day of September, 2025

John A. Squires
*Director of the United States Patent and Trademark Office*